(12) United States Patent
Park

(10) Patent No.: US 12,376,056 B2
(45) Date of Patent: Jul. 29, 2025

(54) METHOD AND APPARATUS FOR ESTIMATING PHASE NOISE IN COMMUNICATION SYSTEM

(71) Applicant: ELECTRONICS AND TELECOMMUNICATIONS RESEARCH INSTITUTE, Daejeon (KR)

(72) Inventor: Hyeong Sook Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 282 days.

(21) Appl. No.: 18/092,555

(22) Filed: Jan. 3, 2023

(65) Prior Publication Data

US 2023/0217390 A1 Jul. 6, 2023

(30) Foreign Application Priority Data

Jan. 4, 2022 (KR) .................. 10-2022-0001090
Jan. 3, 2023 (KR) .................. 10-2023-0000564

(51) Int. Cl.
  *H04L 5/00* (2006.01)
  *H04W 56/00* (2009.01)

(52) U.S. Cl.
  CPC ....... *H04W 56/0035* (2013.01); *H04L 5/0051* (2013.01); *H04L 5/0053* (2013.01)

(58) Field of Classification Search
  CPC ............ H04W 56/0035; H04W 5/0035; H04L 5/0051; H04L 5/0053; H04L 5/0023
  See application file for complete search history.

(56) References Cited

U.S. PATENT DOCUMENTS

| 2016/0330004 | A1  | 11/2016 | Kim et al. |
| 2017/0202014 | A1  | 7/2017  | Moon et al. |
| 2018/0323933 | A1  | 11/2018 | Nam et al. |
| 2020/0077419 | A1  | 3/2020  | Lee et al. |
| 2020/0220750 | A1* | 7/2020  | Zhang ............... H04L 27/0014 |
| 2021/0034518 | A1* | 2/2021  | Heng .................. G06F 3/061 |

(Continued)

OTHER PUBLICATIONS

Yinan Qi et al., "On the Phase Tracking Reference Signal (PT-RS) Design for 5G New Radio (NR)", 2018 IEEE 88th Vehicular Technology Conference (VTC-Fall).

*Primary Examiner* — Sulaiman Nooristany
(74) *Attorney, Agent, or Firm* — LRK PATENT LAW FIRM

(57) ABSTRACT

A method for transmitting a PTRS by a transmitting node may include: identifying a time density and a frequency density of PTRS; identifying a first offset based on the frequency density of PTRS and a second offset based on N times the frequency density of PTRS, N being an integer equal to or greater than 2; determining a position of a subcarrier to transmit a first PTRS and a position of a subcarrier to transmit a second PTRS using the first offset and the second offset; determining a resource block (RB) to transmit each of the first PTRS and the second PTRS from resources allocated to a receiving node; configuring a data channel including data, demodulation reference signals (DMRSs) for demodulation of the data, the first PTRS, and the second PTRS; and transmitting the data channel to the receiving node.

8 Claims, 9 Drawing Sheets

(56) References Cited

U.S. PATENT DOCUMENTS

2021/0037518 A1\* 2/2021 Moroga ................ H04W 72/21
2021/0250915 A1 8/2021 Yoo et al.
2021/0359811 A1 11/2021 Zewail et al.
2021/0359818 A1 11/2021 Zewail et al.
2022/0311647 A1\* 9/2022 Cheng ................ H04L 27/2675

\* cited by examiner

METHOD AND APPARATUS FOR ESTIMATING PHASE NOISE IN COMMUNICATION SYSTEM

CROSS-REFERENCE TO RELATED APPLICATIONS

This application claims priority to Korean Patent Applications No. 10-2022-0001090, filed on Jan. 4, 2022, and No. 10-2023-0000564, filed on Jan. 3, 2023, with the Korean Intellectual Property Office (KIPO), the entire contents of which are hereby incorporated by reference.

BACKGROUND

1. Technical Field

Exemplary embodiments of the present disclosure relate to a technique for transmitting a signal for phase noise estimation in a wireless communication system, and more specifically, to a technique for transmitting a signal for phase noise estimation in a millimeter-wave communication band.

2. Description of Related Art

In a cellular communication network, a terminal (e.g., user equipment (UE)) may generally transmit and receive a data unit through a base station. For example, when there is a data unit to be transmitted to a second terminal, a first terminal may generate a message including the data unit to be transmitted to the second terminal, and transmit the generated message to a first base station to which it belongs. The first base station may receive the message from the first terminal and identify that a destination of the received message is the second terminal. The first base station may transmit the message to a second base station to which the second terminal, which is the identified destination, belongs. The second base station may receive the message from the first base station and may identify that the destination of the received message is the second terminal. The second base station may transmit the message to the second terminal, which is the identified destination. The second terminal may receive the message from the second base station and obtain the data unit included in the received message.

Meanwhile, in order to accommodate data transmission of 100 Gbps or more in the cellular communication network, wireless communication in a ultra-high frequency band of 100 GHz or above that can secure a ultra-wideband frequency band is attracting attention. As a frequency increases, a high local oscillator (LO) frequency needs to be generated, so a frequency multiplier is essential. The frequency multiplier has an output frequency that is N times an input frequency, which increases a phase noise characteristic by 20 $Log_{10}$ N. Since such phase noise causes performance degradation of the system, a technique for overcoming it is required.

SUMMARY

Exemplary embodiments of the present disclosure provide a method of designing a phase-tracking reference signal for reducing performance degradation due to phase noises in a millimeter-wave band or a frequency band higher a millimeter-wave band, and an apparatus of transmitting the phase-tracking reference signal.

According to a first exemplary embodiment of the present disclosure, a method for transmitting a phase-tracking reference signal (PTRS) by a transmitting node may comprise: identifying a time density and a frequency density of PTRS; identifying a first offset based on the frequency density of PTRS and a second offset based on N times the frequency density of PTRS, N being an integer equal to or greater than 2; determining a position of a subcarrier to transmit a first PTRS and a position of a subcarrier to transmit a second PTRS using the first offset and the second offset; determining a resource block (RB) to transmit each of the first PTRS and the second PTRS from resources allocated to a receiving node; configuring a data channel including data, demodulation reference signals (DMRSs) for demodulation of the data, the first PTRS, and the second PTRS; and transmitting the data channel to the receiving node.

The first offset may be determined based on an antenna port of a DMRS associated with the first PTRS among the DMRSs.

The second offset may be determined based on an antenna port of a DMRS associated with the second PTRS among the DMRSs, and may have a value different from the first offset.

The first PTRS and the second PTRS may be preconfigured through higher layer signaling.

The first PTRS and the second PTRS may be arranged within a same one resource block (RB).

When the first PTRS and the second PTRS are arranged within a same one RB, the first PTRS may not be allocated to other RBs within a first resource group of the first PTRS so that the frequency density of PTRS is maintained, and the second PTRS may not be allocated to other RBs within a second resource group of the second PTRS so that the frequency density of PTRS is maintained.

When there are two or more groups of RBs based on the frequency density of PTRS, the first PTRS may be allocated to a first resource group based on the first offset, and the second PTRS may be allocated to a second resource group based on the second offset.

According to a second exemplary embodiment of the present disclosure, a transmitting node comprising a processor, wherein the processor causes to the transmitting node to perform: identifying a time density and a frequency density of PTRS; identifying a first offset based on the frequency density of PTRS and a second offset based on N times the frequency density of PTRS, N being an integer equal to or greater than 2; determining a position of a subcarrier to transmit a first PTRS and a position of a subcarrier to transmit a second PTRS using the first offset and the second offset; determining a resource block (RB) to transmit each of the first PTRS and the second PTRS from resources allocated to a receiving node; configuring a data channel including data, demodulation reference signals (DMRSs) for demodulation of the data, the first PTRS, and the second PTRS; and transmitting the data channel to the receiving node.

The first offset may be determined based on an antenna port of a DMRS associated with the first PTRS among the DMRSs.

The second offset may be determined based on an antenna port of a DMRS associated with the second PTRS among the DMRSs, and may have a value different from the first offset.

The first PTRS and the second PTRS may be preconfigured through higher layer signaling.

The first PTRS and the second PTRS may be arranged within a same one resource block (RB).

When the first PTRS and the second PTRS are arranged within a same one RB, the first PTRS may not be allocated to other RBs within a first resource group of the first PTRS so that the frequency density of PTRS is maintained, and the second PTRS may not be allocated to other RBs within a second resource group of the second PTRS so that the frequency density of PTRS is maintained.

When there are two or more groups of RBs based on the frequency density of PTRS, the first PTRS may be allocated to a first resource group based on the first offset, and the second PTRS may be allocated to a second resource group based on the second offset.

According to the exemplary embodiments of the present disclosure, a reference signal pattern for estimating phase noises when a code division multiplexing (CDM) scheme is applied to a DMRS supporting multi-layer is defined, thereby obtaining a common phase error (CPE) estimation gain.

DETAILED DESCRIPTION OF THE EMBODIMENTS

Figure 1:
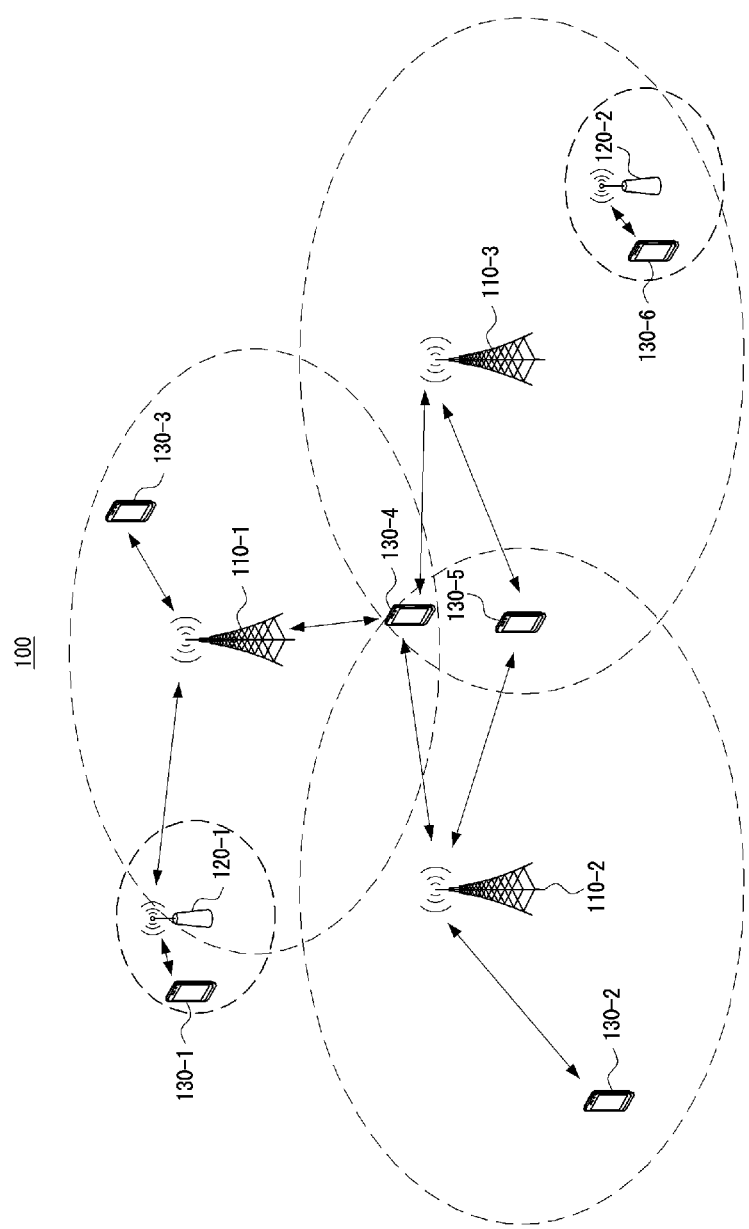
FIG. 1 is a conceptual diagram illustrating a first exemplary embodiment of a communication system.

Exemplary embodiments of the present disclosure are disclosed herein. However, specific structural and functional details disclosed herein are merely representative for purposes of describing exemplary embodiments of the present disclosure. Thus, exemplary embodiments of the present disclosure may be embodied in many alternate forms and should not be construed as limited to exemplary embodiments of the present disclosure set forth herein.

Accordingly, while the present disclosure is capable of various modifications and alternative forms, specific exemplary embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular exemplary embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A communication system to which exemplary embodiments according to the present disclosure are applied will be described. The communication system to which the exemplary embodiments according to the present disclosure are applied is not limited to the contents described below, and the exemplary embodiments according to the present disclosure may be applied to various communication systems. Here, the communication system may have the same meaning as a communication network.

Throughout the present disclosure, a network may include, for example, a wireless Internet such as wireless fidelity (WiFi), mobile Internet such as a wireless broadband Internet (WiBro) or a world interoperability for microwave access (WiMax), 2G mobile communication network such as a global system for mobile communication (GSM) or a code division multiple access (CDMA), 3G mobile communication network such as a wideband code division multiple access (WCDMA) or a CDMA2000, 3.5G mobile communication network such as a high speed downlink packet access (HSDPA) or a high speed uplink packet access (HSDPA), 4G mobile communication network such as a long term evolution (LTE) network or an LTE-Advanced network, 5G mobile communication network, or the like.

Throughout the present disclosure, a terminal may refer to a mobile station, mobile terminal, subscriber station, portable subscriber station, user equipment, access terminal, or the like, and may include all or a part of functions of the terminal, mobile station, mobile terminal, subscriber station, mobile subscriber station, user equipment, access terminal, or the like.

Here, a desktop computer, laptop computer, tablet PC, wireless phone, mobile phone, smart phone, smart watch, smart glass, e-book reader, portable multimedia player (PMP), portable game console, navigation device, digital camera, digital multimedia broadcasting (DMB) player, digital audio recorder, digital audio player, digital picture recorder, digital picture player, digital video recorder, digital video player, or the like having communication capability may be used as the terminal.

Throughout the present specification, the base station may refer to an access point, radio access station, node B (NB), evolved node B (eNB), base transceiver station, mobile multihop relay (MMR)-BS, or the like, and may include all or part of functions of the base station, access point, radio access station, NB, eNB, base transceiver station, MMR-BS, or the like.

Hereinafter, preferred exemplary embodiments of the present disclosure will be described in more detail with reference to the accompanying drawings. In describing the present disclosure, in order to facilitate an overall understanding, the same reference numerals are used for the same elements in the drawings, and duplicate descriptions for the same elements are omitted.

FIG. 1 is a conceptual diagram illustrating a first exemplary embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. The plurality of communication nodes may support 4th generation (4G) communication (e.g., long term evolution (LTE), LTE-advanced (LTE-A)), 5th generation (5G) communication (e.g., new radio (NR)), or the like. The 4G communication may be performed in a frequency band of 6 gigahertz (GHz) or below, and the 5G communication may be performed in a frequency band of 6 GHz or above as well as the frequency band of 6 GHz or below.

For example, for the 4G and 5G communications, the plurality of communication nodes may support a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, a filtered OFDM based communication protocol, a cyclic prefix OFDM (CP-OFDM) based communication protocol, a discrete Fourier transform spread OFDM (DFT-s-OFDM) based communication protocol, an orthogonal frequency division multiple access (OFDMA) based communication protocol, a single carrier FDMA (SC-FDMA) based communication protocol, a non-orthogonal multiple access (NOMA) based communication protocol, a generalized frequency division multiplexing (GFDM) based communication protocol, a filter bank multi-carrier (FBMC) based communication protocol, a universal filtered multi-carrier (UFMC) based communication protocol, a space division multiple access (SDMA) based communication protocol, or the like.

In addition, the communication system 100 may further include a core network. When the communication system 100 supports the 4G communication, the core network may comprise a serving gateway (S-GW), a packet data network (PDN) gateway (P-GW), a mobility management entity (MME), and the like. When the communication system 100 supports the 5G communication, the core network may comprise a user plane function (UPF), a session management function (SMF), an access and mobility management function (AMF), and the like.

Meanwhile, each of the plurality of communication nodes 110-1, 110-2, 110-3, 120-1, 120-2, 130-1, 130-2, 130-3, 130-4, 130-5, and 130-6 constituting the communication system 100 may have the following structure.

Figure 2:
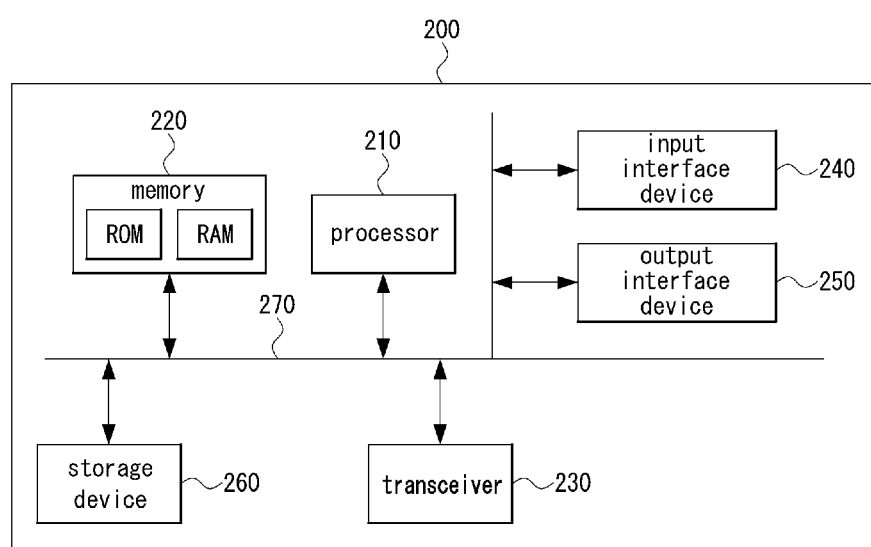
FIG. 2 is a block diagram illustrating a first exemplary embodiment of a communication node constituting a communication system.

FIG. 2 is a block diagram illustrating a first exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

However, each component included in the communication node 200 may be connected to the processor 210 via an individual interface or a separate bus, rather than the common bus 270. For example, the processor 210 may be connected to at least one of the memory 220, the transceiver 230, the input interface device 240, the output interface device 250, and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. The communication system 100 including the base stations 110-1, 110-2, 110-3, 120-1, and 120-2 and the terminals 130-1, 130-2, 130-3, 130-4, 130-5, and 130-6 may be referred to as an 'access network'. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may refer to a Node-B, a evolved Node-B (eNB), a base transceiver station (BTS), a radio base station, a radio transceiver, an access point, an access node, a road side unit (RSU), a radio remote head (RRH), a transmission point (TP), a transmission and reception point (TRP), an eNB, a gNB, or the like.

Here, each of the plurality of terminals 130-1, 130-2, 130-3, 130-4, 130-5, and 130-6 may refer to a user equipment (UE), a terminal, an access terminal, a mobile terminal, a station, a subscriber station, a mobile station, a portable subscriber station, a node, a device, an Internet of things (IoT) device, a mounted apparatus (e.g., a mounted module/device/terminal or an on-board device/terminal, etc.), or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul or a non-ideal backhaul, and exchange information with each other via the ideal or non-ideal backhaul. Also, each of the plurality of base stations 110-1, 110-2, 110-3, 120-1, and 120-2 may be connected to the core network through the ideal or non-ideal backhaul. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

In addition, each of the plurality of base stations 110-1, 110-2, 110-3, 120-1, and 120-2 may support multi-input multi-output (MIMO) transmission (e.g., a single-user MIMO (SU-MIMO), multi-user MIMO (MU-MIMO), massive MIMO, or the like), coordinated multipoint (CoMP) transmission, carrier aggregation (CA) transmission, transmission in an unlicensed band, device-to-device (D2D) communications (or, proximity services (ProSe)), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2, and operations supported by the plurality of base stations 110-1, 110-2, 110-3, 120-1, and 120-2. For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

The first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Hereinafter, methods and apparatuses for phase noise estimation will be described. Even when a method (e.g., transmission or reception of a data packet) performed at a first communication node among communication nodes is described, the corresponding second communication node may perform a method (e.g., reception or transmission of the data packet) corresponding to the method performed at the first communication node. That is, when an operation of a terminal is described, a corresponding base station may perform an operation corresponding to the operation of the terminal. Conversely, when an operation of a base station is described, a corresponding terminal may perform an operation corresponding to the operation of the base station.

Meanwhile, in a communication system, a base station may perform all functions (e.g., remote radio transmission/reception function, baseband processing function, and the like) of a communication protocol. Alternatively, the remote radio transmission/reception function among all the functions of the communication protocol may be performed by a transmission reception point (TRP) (e.g., flexible (f)-TRP), and the baseband processing function among all the functions of the communication protocol may be performed by a baseband unit (BBU) block. The TRP may be a remote radio head (RRH), radio unit (RU), transmission point (TP), or the like. The BBU block may include at least one BBU or at least one digital unit (DU). The BBU block may be referred to as a 'BBU pool', 'centralized BBU', or the like. The TRP may be connected to the BBU block through a wired fronthaul link or a wireless fronthaul link. The communication system composed of backhaul links and fronthaul links may be as follows. When a functional split scheme of the communication protocol is applied, the TRP may selectively perform some functions of the BBU or some functions of medium access control (MAC)/radio link control (RLC) layers.

In recent wireless communication systems, in order to accommodate data transmission of 100 Gbps or more in a millimeter wave band, wireless communication in a ultra-high frequency band of 100 GHz or above that can secure a ultra-wideband frequency band is attracting attention. As a frequency increases, a high local oscillator (LO) frequency needs to be generated, so a frequency multiplier is essential. The frequency multiplier has an output frequency that is N times an input frequency, which increases a phase noise characteristic by 20 $\text{Log}_{10}$ N.

More specifically, different local oscillators are used between a transmitting node and a receiving node of the wireless communication system. Therefore, even if the local oscillators are precisely tuned, a frequency mismatch may occur between the oscillators. This causes a bigger problem in a high frequency band such as a millimeter wave. The mismatch of the LO frequencies, i.e., a difference in the frequencies, means a spectral shift of received signals in a baseband. In a wireless communication system using an orthogonal frequency-division multiplexing (OFDM) scheme, the spectral shift of the received signals in the baseband may weaken orthogonality between subcarriers, and may lower a signal to interference noise ratio (SINK) at the receiving node. That is, a phase noise occurs due to the mismatch of the LO frequencies.

Since such the phase noise causes performance degradation of the system, a technique for overcoming it is required. In the 5G NR millimeter wave band, a phase-tracking reference signal (PTRS) has been introduced to compensate for the above-described phase noise. A transmitting node transmits an OFDM signal in the time domain and/or the frequency domain by configuring a PTRS using a density varying according to a modulation and coding scheme (MCS). Here, the density may be divided into a time-domain density (i.e., time density) and a frequency-domain density (i.e., frequency density).

In an OFDM signal, the time density is defined as $L_{PTRS} \in \{1,2,4\}$, and the frequency density is defined as $K_{PTRS} \in \{2,4\}$. For example, when the frequency density $K_{PTRS}=2$ and the time density $L_{PTRS}=2$, the PTRS is allocated to every two OFDM symbols in the time domain and every two resource blocks (RBs) in the frequency domain. Assuming that the transmitting node and the receiving node are perfectly synchronized, a frequency-domain signal of an m-th OFDM symbol in a subcarrier k of the receiving node, considering only the phase noise, may be expressed by Equation 1 below.

$$R_m(k) = \underbrace{X_m(k)H_m(k)I_m(0)}_{CPE} + \underbrace{\sum_{\substack{l=-N/2 \\ l \neq k}}^{N/2-1} X_m(l)H_m(l)I_m(l-k)}_{ICI} + W_m(k) \quad \text{[Equation 1]}$$

In Equation 1, $X_m(k)$ is a transmission signal, $H_m(k)$ is a channel function in the frequency domain, and $W_M(k)$ is an additive white Gaussian noise (AWGN). Further, in Equation 1, $I_m(i)$ is a function of a phase noise $\theta_m(n)$, as shown in <Equation 2> below.

$$I_m(i) = \frac{1}{N} \sum_{n=-N/2}^{N/2-1} e^{j\theta_m(n)} e^{j2\pi ni/N}, i = -\frac{N}{2}, \ldots \frac{N}{2}-1 \quad \text{[Equation 2]}$$

In Equation 1, the phase noise shows that a common phase error (CPE) and an inter-carrier interference (ICI) occur in an OFDM demodulation signal. The CPE component may be estimated by Equation 3 below using a reference signal such as PTRS.

$$\hat{I}_m(0) = \frac{\sum_{k \in S_p} R_m(k) X_m^*(k) H_m^*(k)}{\sum_{k \in S_p} |X_m(k) H_m(k)|^2} \quad \text{[Equation 3]}$$

Meanwhile, in order to analyze performance according to the increase in phase noise as described above, in a thesis 'On the Phase-tracking Reference Signal (PT-RS) Design for 5G New Radio (NR)' by Yiny Qi et al. in VTC-fall in 2018, a phase noise model for a millimeter wave band or a higher band has been estimated by using a phase noise model used for PTRS design in the 5G NR.

Figure 3:
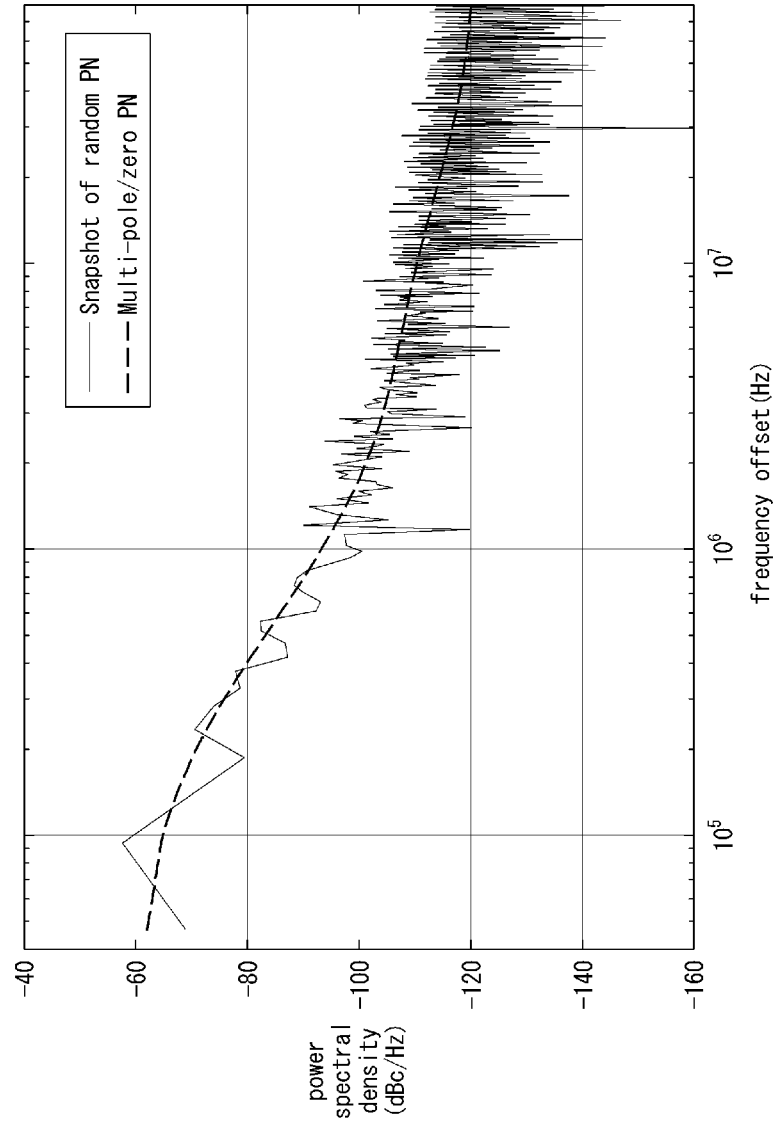
FIG. 3 is a graph illustrating simulation results of a 30 GHz band phase noise model and a 250 GHz frequency band phase noise model with a power spectral density (PSD) of each phase noise model.

FIG. 3 is a graph illustrating simulation results of a 30 GHz band phase noise model and a 250 GHz frequency band phase noise model with a power spectral density (PSD) of each phase noise model.

Specifically, FIG. 3 illustrates a simulation result graph based on the thesis by Yiny Qi et al. Referring to FIG. 3, a vertical axis represents a power spectral density (PSD) and a horizontal axis represents a frequency offset. A solid line in FIG. 3 represents a phase noise model for a 30 GHz frequency band, and a dotted line in FIG. 3 represents a phase noise model for a 250 GHz frequency band in which noise is increased by 20 $\text{Log}_{10}$ (250/30) from that of the 30 GHz frequency band.

The use of PTRS in the 5G NR systems is primarily to estimate and minimize the impact of CPE on system performance. Due to the phase noise characteristic, the PTRS may have low density in the frequency domain and high density in the time domain. In addition, the PTRS may always be transmitted together with a demodulation reference signal (DMRS) for data channel demodulation. If the network is configured to have only the PTRS, it may be configured to transmit only the PTRS.

As described above, the phase noise is generated by a frequency difference according to the implementation of local oscillators provided between the transmitting node and the receiving node, and the phase noise may damage orthogonality of subcarriers in the OFDM scheme. As a result, a CPE occurs, resulting in a constant rotation angle of a modulation constellation, ICI, and scattering of constellation points in the OFDM-based system. In particular, the phase noise may limit the maximum received SINR at a higher carrier frequency. The effects of phase noise may be addressed by using large subcarrier spacings and phase noise estimation and compensation at the receiving node.

Meanwhile, one of use cases of a non-terrestrial network (NTN) being discussed in the recent 5G NR standardization is that an aerial vehicle (e.g., satellite or drone) serving as a relay is connected to terrestrial nodes through a wireless backhaul using millimeter waves. In an NTN environment comprising satellites or drones, a distance between a transmitting node and a receiving node may be quite long, and it is expected that a high modulation order will be used for Enhanced Mobile Broadband (eMBB) data. In addition, in the case of a low earth orbit (LEO) satellite among satellites, it moves at a constant altitude from the earth at a very high speed. When considering such the fast-moving satellite, the CPO and Doppler effect may occur in the NTN environment. Therefore, considering such the scenario in the 5G NR system, not only PTRS design but also phase-tracking and compensation using the PTRS may become a more important factor.

When the CPE is estimated as shown in Equation 3 above, $H_m^*(k)$ may be obtained using the DMRS for data channel demodulation. As described above, the PTRS is related to the DMRS. In particular, since the 5G NR system does not use a cell specific reference signal (CRS) unlike the LTE system, the DMRS is transmitted along with a physical downlink shared channel (PDSCH) carrying user data. Accordingly, the PTRS is also transmitted along with the PDSCH channel on which the DMRS is transmitted.

Figure 4:
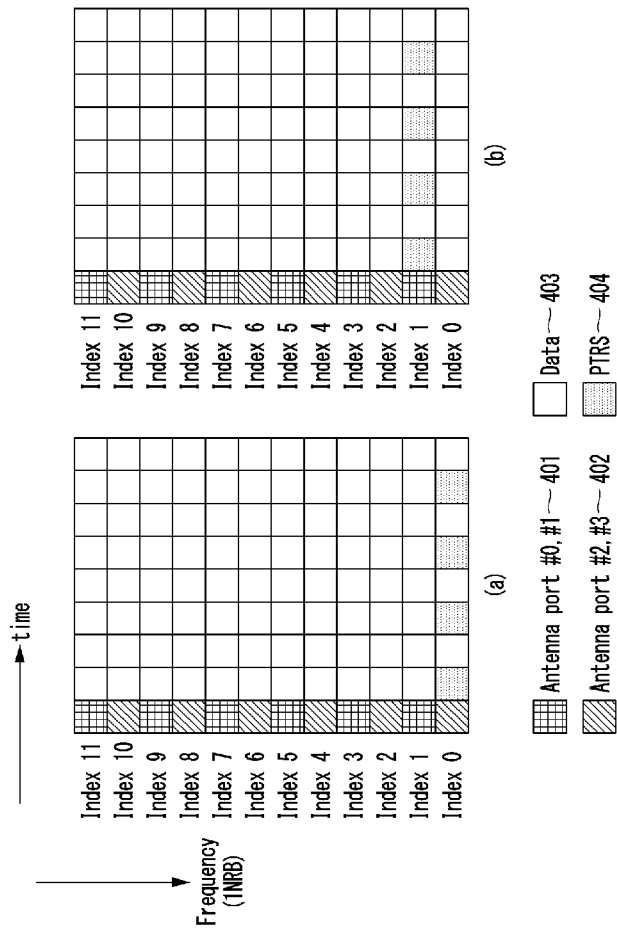
FIG. 4 is a conceptual diagram for describing DMRS and PTRS arrangement of a PDSCH in the 5G NR millimeter wave band.

FIG. 4 is a conceptual diagram for describing DMRS and PTRS arrangement of a PDSCH in the 5G NR millimeter wave band.

Referring to FIG. 4, a case in which a plurality of symbols each including 12 subcarriers are sequentially transmitted in time is illustrated. In addition, indexes from 0 to 11 are assigned to the respective subcarriers illustrated in FIG. 4, and these indexes may be set based on frequencies of the subcarriers. FIG. 4 shows a PDSCH configuration, and a physical downlink control channel (PDCCH) may be transmitted in the starting two or three symbols.

Referring to FIG. 4, a case in which DMRSs supporting four layers are located in the first symbol in the time domain is illustrated. According to the 5G NR technical specifications, the DMRS may have two types. One of the two types is a configuration in which up to 4 DMRS ports are allocated to one symbol, and the other type is a configuration in which up to 6 MDRS ports are allocated to one symbol.

Referring to FIG. 4, antenna ports #0 and #1 (i.e., 401) are allocated to subcarrier indexes 0, 2, 4, 6, 8, and 10, and antenna ports #2 and #3 (i.e., 402) are allocated to subcarrier indexes 1, 3, 5, 7, 9, and 11. In order to allocate two different antenna ports to one subcarrier, the 5G NR has adopted code division multiplexing (CDM) scheme. Since the form in which the antenna ports #0 and #1 are allocated to the subcarrier indexes 0, 2, 4, 6, 8, and 10, and the antenna ports #2 and #3 are allocated to the subcarrier indexes 1, 3, 5, 7, 9, and 11 looks like a 'comb', it may be sometimes referred to as a 'comb structure'.

The PTRS may be transmitted through one subcarrier among subcarriers corresponding to the subcarrier indexes 0, 2, 4, 6, 8, and 10 allocated to the antenna ports #0 and #1, and the PTRS may be transmitted through one subcarrier among subcarriers corresponding to the subcarrier indexes 1, 3, 5, 7, 9, and 11. In this case, the PTRS may be allocated to a subcarrier having the lowest index among the subcarriers.

Accordingly, in (a) of FIG. 4, a PTRS 404 is transmitted through a subcarrier indicated by the subcarrier index 0 corresponding to the antenna ports #0 and #1, and in (b) of FIG. 4, the PTRS 404 is transmitted through a subcarrier indicated by the subcarrier index 1 corresponding to the antenna ports #2 and #3. In (a) and (b) of FIG. 4, data of a PDSCH may be transmitted in subcarriers in which DMRS and PTRS are not transmitted.

Meanwhile, as shown in Equation 3 described above, when a CPE is estimated, the channel function $H_m^*(k)$ may be obtained using the DMRS.

In order to enable a data rate of 100 Gbps or more in a band of mmWave or higher, 4×4 Line of Sight (LOS) MIMO, etc. may be considered. The DMRS antenna ports supporting multi-layer may have port numbers 0 to 3, and may be determined based on Equation 4 below and parameters of Table 1 below.

$$\alpha_{(k,l)}^{(p)} = w_f(k')r(2n+k')$$

$$k = 4n + 2k' + \Delta$$

$$k' = 0, 1$$

$$n = 0, 1, \ldots \qquad \text{[Equation 4]}$$

As described above, the parameters for the DMRS may be determined based on Table 1 below.

TABLE 1

| | | $w_f(k')$ | |
| p | Δ | k' = 0 | k' = 1 |
| --- | --- | --- | --- |
| 0 | 0 | +1 | +1 |
| 1 | 0 | +1 | −1 |
| 2 | 1 | +1 | +1 |
| 3 | 1 | +1 | −1 |

In Equation 4, r(m) is a DMRS sequence, and may be composed of elements mapped to resources according to subcarrier indexes and symbol indexes $(k,l)_p$ of OFDM symbols.

The PTRS allocated in relation to the DMRS may be configured differently according to time density, frequency density, and MCS level, and may be transmitted as an OFDM signal. The time density of PTRS may be $L_{PTRS} \in \{1, 2, 4\}$, and the frequency density of PTRS may be $K_{PTRS} \in \{2, 4\}$.

Referring again to FIG. 4, the time density of PTRS illustrated in (a) and (b) of FIG. 4 may be $L_{PTRS}=2$, and the frequency density thereof may correspond to a case in which one PTRS is mapped for one resource block (RB). That is, $K_{PTRS}$ is a value per RB. A rule for mapping the PTRS resources in the frequency domain may be as shown in Equation 5 below.

$$k = (k_{ref}^{RE} + i \cdot K_{PTRS}) N_{sc}^{RB} \qquad \text{[Equation 5]}$$

In Equation 5, the number $N_{sc}^{RB}$ of subcarriers included in one RB is 12, i may be 0,1,2 . . . , or the like. $k_{ref}^{RE}$ means an offset according to a DMRS antenna port as shown in an offset table below. One port according to the lowest port index among the DMRS antenna ports is allocated to the PTRS, and the PTRS may be transmitted through the allocated port.

TABLE 2

| DM-RS port | 0 | 1 | 2 | 3 |
| --- | --- | --- | --- | --- |
| Offset | 0 | 2 | 1 | 3 |

Hereinafter, processing in a receiving node will be described. As described above, when a signal including DMRS and PTRS is transmitted, the receiving node may receive the signal including DMRS and PTRS. The receiving node may calculate a frequency-domain correlation using a CDMed DMRS. Also, the receiving node may calculate an average for $N_{sc}^{RB}$ to calculate a channel estimation value per $N_{sc}^{RB}$ as shown in Equation 6 below.

$$\hat{H}_m(k) = \frac{1}{N_{SC}^{RB}} \sum_{k=0}^{N_{SC}^{RB}-1} \frac{R_m(k)X_m(k)}{S_p} + W(k) \qquad \text{[Equation 6]}$$

An estimated CPE may be obtained by applying the estimated channel estimation value to $H_m^*(k)$ in Equation 3 described above. However, in the actual OFDM system, even if time tracking is continuously performed for data demodulation, some time-domain samples always have errors. A time delay of the time-domain samples appears as a phase component in the frequency domain. Therefore, when compensating for the CPE estimated using the PTRS, the phase component may cause performance degradation in 64QAM or higher order modulation schemes that are inferior to phase noise. This may become more sensitive to the time-delayed samples as a subcarrier spacing is increased to use a higher order modulation scheme. Here, since a method of increasing the subcarrier spacing is restricted, an ICI cancellation technique may be additionally required.

In the present disclosure, in order to reduce such performance degradation, a method for preventing performance degradation is proposed by designing offsets for PTRS using a method different from the method described in FIG. 4.

In the present disclosure, when PTRS is allocated, the time density $L_{PTRS}$ is set in the same manner as described above, and the frequency density $K_{PTRS}$ may correspond to a case in which one PTRS is allocated for one RB. However, a scheme of allocating and using offsets alternately may be used.

Figure 5A:
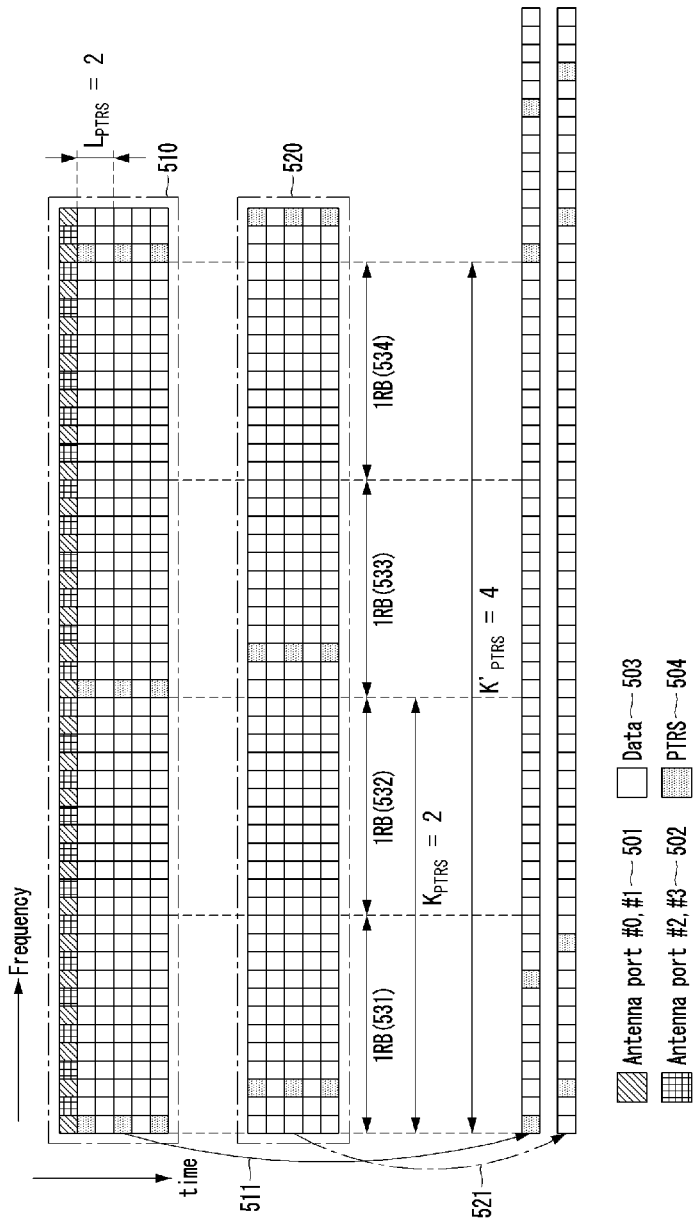
FIG. 5A is an exemplary diagram for describing PTRS arrangement according to a first exemplary embodiment of the present disclosure.

FIG. 5A is an exemplary diagram for describing PTRS arrangement according to a first exemplary embodiment of the present disclosure.

Referring to FIG. 5A, a horizontal axis is a frequency axis, and a vertical axis is a time axis. That is, a form in which CDMed DMRSs are allocated to different antenna ports for each subcarrier is shown at the top of the horizontal axis. Specifically, the DMRS may be transmitted through antenna ports #0 and #1 (i.e., 501) on even-numbered subcarriers, and the DMRS may be transmitted through antenna ports #2 and #3 (i.e., 502) on odd-numbered subcarriers. As described above, it can be seen that the time density $L_{PTRS}$ is set to 2.

Looking at the entire data channel structure through which data is transmitted in FIG. 5A, it can be seen that the PTRS is transmitted in a period of a first RB 531 in the manners (a) and (b) described with reference to FIG. 4. That is, since the time density $L_{PTRS}$ is set to 2, it can be seen that the PTRS is transmitted only in one symbol for every two consecutive symbols in the time period.

In FIG. 5A, four RBs are illustrated in the frequency domain, and a configuration in which the first RB 531, second RB 532, third RB 533, and fourth RB 534 are arranged is illustrated. Since the case corresponds to a case in which the frequency density $K_{PTRS}$ is set to 2, the PTRS may be transmitted in the first RB 531 and the third RB 534.

In the present disclosure, an arrangement method for reducing performance degradation by changing such the PTRS arrangement pattern is proposed. First, a PTRS pattern 510 may be changed to a pattern indicated by a reference numeral 511 by changing the position of the PTRS in one time region. Such the PTRS position change scheme may correspond to a case where the frequency density $K_{PTRS}$ set to 2 is changed to $K_{PTRS}'=2 \cdot K_{PTRS}$.

That is, two PTRSs are transmitted for the four RBs 531, 532, 533, and 534, but in the frequency domain, the PTRS is transmitted only through two subcarriers in the first RB 531, and is not transmitted through the second RB 532, the third RB 533, and the fourth RB 534. Here, the two RBs 531 and 532 or the four RBs 531, 532, 533, and 534 may become one RB group based on the frequency density of PTRS. In case of a general RB group, when the frequency density $K_{PTRS}$ is determined to be 2, two RBs may become one RB group, but in the present disclosure, since a second offset is considered, an RB group may be determined considering the second offset. That is, in the present disclosure, overhead is not increased by not changing the frequency density $K_{PTRS}$.

This allows the PTRS patterns 520 to be changed to a pattern indicated by a reference numeral 521 by changing the position of the PTRS in one time region. That is, Such the PTRS position change scheme may correspond to a case where the frequency density $K_{PTRS}$ set to 2 is changed to $K_{PTRS}'=2 \cdot K_{PTRS}$. In the frequency domain, the PTRS may be transmitted only through two subcarriers in the first RB 531, and may not be transmitted in the second RB 532, the third RB 533, and the fourth RB 534.

As shown in FIG. 5A, even when the arrangement pattern of the PTRS is changed, it can be seen that the overhead is the same from the viewpoint of the overhead of the PTRS. As such, the arrangement pattern of the PTRS according to the present disclosure may be calculated as shown in Equation 7 below.

$$k=(k_{ref}^{RE}+k' \cdot k_{ref1}^{RE})+(i \cdot K_{PTRS}) N_{sc}^{RB}, K_{PTRS}'=2 \cdot K_{PTRS} \quad \text{[Equation 7]}$$

In Equation 7, the number $N_{sc}^{RB}$ subcarriers allocated to one RB is 12, i may be 0,1,2 . . . , or the like, and k' may be 0 or 1. In addition, in Equation 7, $k_{ref}^{RE}$ may have the same value as in Table 2 described above, and $k_{ref1}^{RE}$ may be a value corresponding to $k_{ref}^{RE}$ as shown in Table 3 below.

TABLE 3

| DM-RS port | 0 | 1 | 2 | 3 |
|---|---|---|---|---|
| Offset($k_{ref}^{RE}$) | 0 | 2 | 1 | 3 |
| Offset($k_{ref1}^{RE}$) | 8 | 10 | 9 | 11 |

As illustrated in Table 3, two different offsets may be used in the present disclosure. The first offset $k_{ref}^{RE}$ and the second offset $k_{ref1}^{RE}$ may have different values as shown in Table 3. Also, both the first offset and the second offset may mean frequency-domain offsets within one RB. Also, the values of the second offset, shown in Table 3, are an example, and other values may be used. However, the second offset may be configured to have a different value from the first offset.

The first offset and the second offset described above may be pre-configured between the transmitting node and the receiving node. In order to configure the first offset and the second offset in advance, when the transmitting node is a base station, higher layer signaling may be performed using, for example, an RRC configuration message or an RRC reconfiguration message. As another example, when the transmitting node is a terminal (i.e., user equipment (UE)), the first offset and the second offset may be configured based on higher layer signaling provided from the receiving node, for example, an RRC configuration message or an RRC reconfiguration message.

Hereinafter, a second exemplary embodiment of the present disclosure, which is different from the first exemplary embodiment of the present disclosure that has been described above, will be described.

Figure 5B:
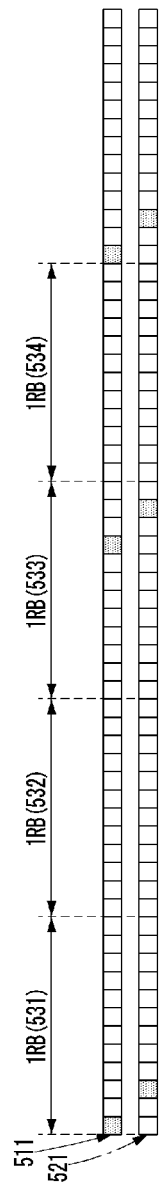
FIG. 5B is an exemplary diagram for describing PTRS arrangement according to a second exemplary embodiment of the present disclosure.

FIG. 5B is an exemplary diagram for describing PTRS arrangement according to a second exemplary embodiment of the present disclosure.

Looking at FIG. 5B in comparison with FIG. 5A, FIG. 5B is a diagram illustrating only a portion where the PTRS arrangement pattern is changed according to the present disclosure in a lower part of FIG. 5A described above. Therefore, the exemplary embodiment of FIG. 5A and the exemplary embodiment of FIG. 5B may have different arrangement patterns.

Referring to FIG. 5B, the first RB 531, second RB 532, and third RB 534 are illustrated in the same manner as in FIG. 5A.

First, in the case of the reference numeral 511, the PTRS is transmitted in the first RB 531 and the third RB 533. However, the position of the PTRS transmitted in the first RB 531 may be determined based on the offset described in Table 1, and the position of the PTRS transmitted in the third RB 533 may be determined based on the offset described in Table 2. That is, the PTRS arrangement pattern illustrated in FIG. 5B may be a form of allocating the PTRS in the frequency domain by alternately using $k_{ref}^{RE}$ and $k_{ref1}^{RE}$.

In the case of reference numeral 521, the PTRS is also transmitted in the first RB 531 and the third RB 533. However, the position of the PTRS transmitted in the first RB 531 may be determined based on the offset described in Table 1 described above, and the position of the PTRS transmitted in the third RB 533 may be determined based on the offset described in Table 2. That is, in the case of reference numeral 521 illustrated in FIG. 5B, the PTRS arrangement pattern may be a form of allocating the PTRS in the frequency domain by alternately using $k_{ref}^{RE}$ and $k_{ref1}^{RE}$.

The pattern for arranging the PTRS in the frequency domain in the above-described manner may be calculated as shown in Equation 8 below.

$$k = k_{ref}^{RE'} + (i \cdot K_{PTRS})N_{SC}^{RB}, k_{ref}^{RE'} = \begin{cases} k_{ref}^{RE} & \text{if } i \bmod 2 = 0 \\ k_{ref1}^{RE} & \text{otherwise} \end{cases} \quad \text{[Equation 8]}$$

In Equation 8, the number $N_{sc}^{RB}$ subcarriers allocated to one RB is 12, i may be 0,1,2 . . . . In addition, in Equation 8, $k_{ref}^{RE}$ may have the same value as in Table 2 described above, and $k_{ref1}^{RE}$ may be a value corresponding to $k_{ref}^{RE}$ as shown in Table 3 above.

Figure 5C:
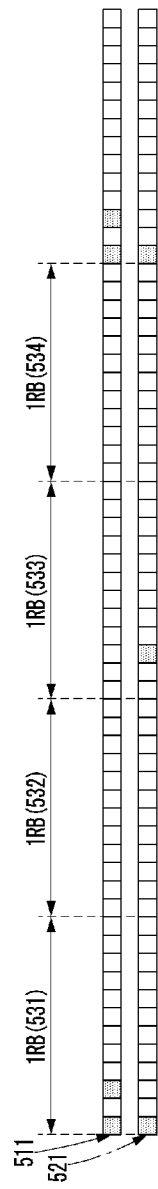
FIG. 5C is an exemplary diagram for describing PTRS arrangement according to a third exemplary embodiment of the present disclosure.

FIG. 5C is an exemplary diagram for describing PTRS arrangement according to a third exemplary embodiment of the present disclosure.

Looking at FIG. 5C in comparison with FIG. 5A, FIG. 5C is a diagram illustrating only a portion where the PTRS arrangement pattern is changed according to the present disclosure in a lower part of FIG. 5A described above. Therefore, the exemplary embodiment of FIG. 5A and the exemplary embodiment of FIG. 5C may have different arrangement patterns.

Referring to FIG. 5C, the first RB 531, second RB 532, and third RB 534 are illustrated in the same manner as in FIG. 5A.

First, in the case of reference numeral 511, the PTRS is transmitted only in the first RB 531. In addition, in the case of reference numeral 521, the PTRS may be transmitted in the first RB 531 and the third RB 533, which corresponds to the case where calculation of an average as long as a CDM length according to the above-described Equation 6 is performed. For example, ($k_{ref}^{RE}$, $k_{ref1}^{RE}$) may correspond to (0,2) or (1,3).

That is, according to the exemplary embodiment of FIG. 5C, in the case of reference numeral 511, two PTRSs may be transmitted as being allocated to a specific one RB, i.e., the first RB 531, as described in FIG. 5A. In the case of reference numeral 521, the PTRS may be transmitted in the first RB 531 and the third RB 533. As shown by reference numeral 521, the PTRS transmitted in the first RB 531 may be allocated by alternately using offset (0,2) and (1,3) corresponding to the DMRS ports. In transmitting the PTRS, it is possible to allocate the PRTS to be less sensitive to received sample errors by alternately allocating different offset values.

Figure 6:
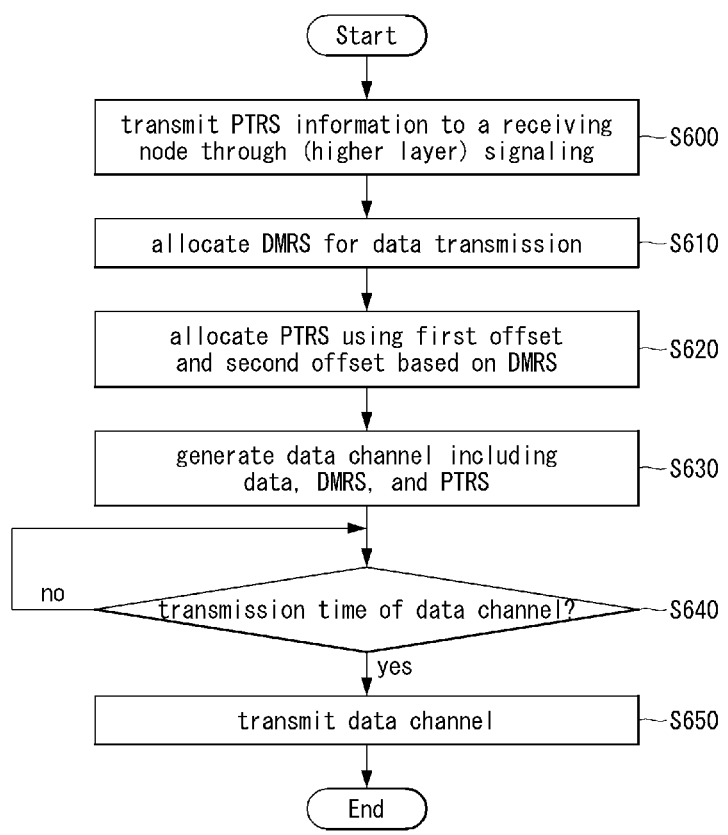
FIG. 6 is a signal flow diagram when a transmitting node transmits a data channel including PTRS according to the present disclosure.

FIG. 6 is a signal flow diagram when a transmitting node transmits a data channel including PTRS according to the present disclosure.

Prior to referring to FIG. 6, it is assumed that a transmitting node according to the present disclosure is a base station and described using a reference numeral 110, and a receiving node is assumed to be a user equipment (UE) and described using a reference numeral 130. However, even when the transmitting node is a terminal and the receiving node is a base station, the same or similar method as described below may be applied.

In a step S600, the transmitting node 110 may transmit PTRS information to the receiving node 130 (e.g., terminal) using signaling (e.g., high layer signaling). The higher layer signaling may be RRC signaling and/or MAC layer signaling. In addition, the PTRS information may include the offset information of Table 3 described in the present disclosure. If the offset information of Table 3 is stored in advance by both the transmitting node and the receiving node, the step S600 may be omitted. However, if the transmitting node 110 transmits information such as DMRS configuration and PTRS downlink configuration (e.g., PTRS-DownlinkConfig) through higher layer signaling, it may be performed in the signaling of the step S600.

In a step S610, if data transmission is required, the transmitting node 110 may arrange a DMRS for data transmission to the receiving node 130 in a transmission resource, for example, a specific resource of a data channel. The DMRS may be arranged in the specific resource as being CDMed or not CDMed according to the number of antenna ports. Since the DMRS arrangement method has already been described with reference to FIG. 4 or is widely known, additional description thereof will be omitted.

The transmitting node 110 may arrange a PTRS based on the DMRS arranged in a step S620. In this case, the PTRS may be arranged using one of the methods described above with reference to FIG. 5A, FIG. 5B or FIG. 5C. For example, a position of subcarriers through which a first PTRS is transmitted may be determined using a first offset based on a frequency density of PTRS. In addition, a position of subcarriers through which a second PTRS is transmitted may be determined using a second offset based on N times the frequency density of PTRS (N is an integer greater than or equal to 2). Specifically, in FIGS. 5A to 5C, the case of using twice the frequency density has been described. In addition, RBs to transmit each of the first PTRS and the second PTRS may be determined. When the RBs to transmit the first PTRS and the second PTRS are determined, the PTRS may not be transmitted in some RBs within RBs configured as one group based on the frequency density of PTRS. For specific examples, referring to FIGS. 5A to 5C described above, the RBs in which the PTRS is not transmitted may be identified among the RBs configured as one group based on the frequency density of PTRS. That is, as described in FIGS. 5A to 5C, the PTRS may be arranged in a specific frequency region and time region using the first offset and the second offset. Since this has also been described above, redundant description will be omitted.

Thereafter, the transmitting node 110 may arrange data, DMRS, and PTRS in an allocated resource in a step S630. The allocated resource may be a resource for transmitting the data and may be transmitted on a data channel. Accordingly, the data channel to be transmitted may be a data channel including the data, DMRS, and PTRS. Further, in the present disclosure, the data channel may refer to a unit in which the transmitting node 110 transmits OFDM symbols including the data, DMRS, and PTRS to the receiving node 130. Therefore, depending on the system, it may be referred to as a transmission time interval (TTI), may be referred to as a packet, or may be referred as a slot. In addition, in the present disclosure, the data channel may refer to a physical channel, for example, a PDSCH which is a downlink data channel of the 5G NR, or a physical uplink shared channel (PUSCH) which is an uplink data channel thereof.

The transmitting node 110 may identify whether a transmission time of the data channel has arrived in a step S640. When the transmitting node 110 uses a time division duplex (TDD) scheme, it may be identified whether the transmission time belongs to a TDD slot capable of transmitting the data channel to the receiving node. As another example, since the transmitting node 110 may be a base station even when using a frequency division duplex (FDD) scheme, if data needs to be transmitted to a plurality of receiving nodes, it may need to be identified whether a transmission time of the data channel generated in the step S630 for a specific receiving node (i.e., receiving node to receive the data channel) has arrived.

When it is a time to transmit the data channel in the step S640, the transmitting node 110 may proceed to a step S650 and transmit the generated data channel to the corresponding receiving node 130. If the transmission time of the data channel has not arrived in the step S640, the transmission node 110 may wait until the transmission time of the data channel arrives.

The transmitting node 110 may transmit the data channel to the receiving node 130 using the method described above. Accordingly, the receiving node 130 may receive the data channel, and correct a phase error using the PTRS included in the received data channel.

Figure 7:
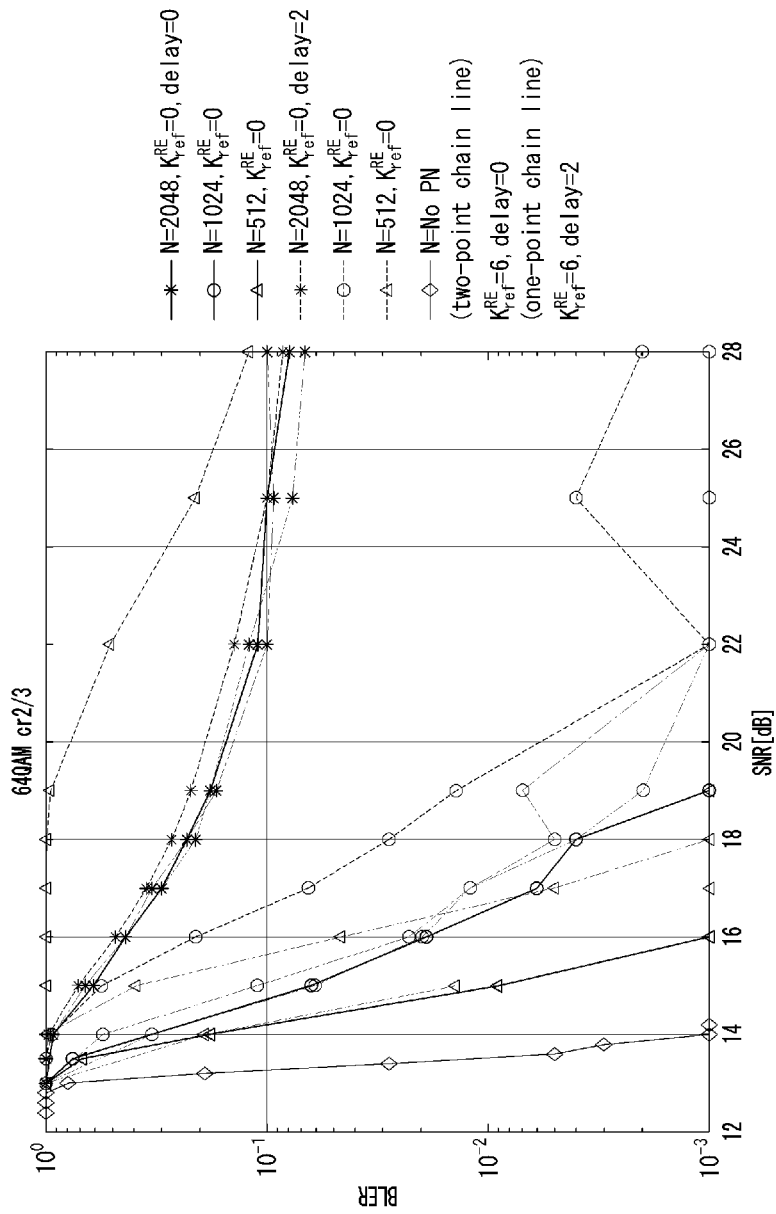
FIG. 7 is a simulation graph for 64QAM reception performance in an AWGN channel according to $k_{REf}^{RE}$ and time-delayed samples based on the PTRS arrangement method according to the present disclosure.
Figure 8:
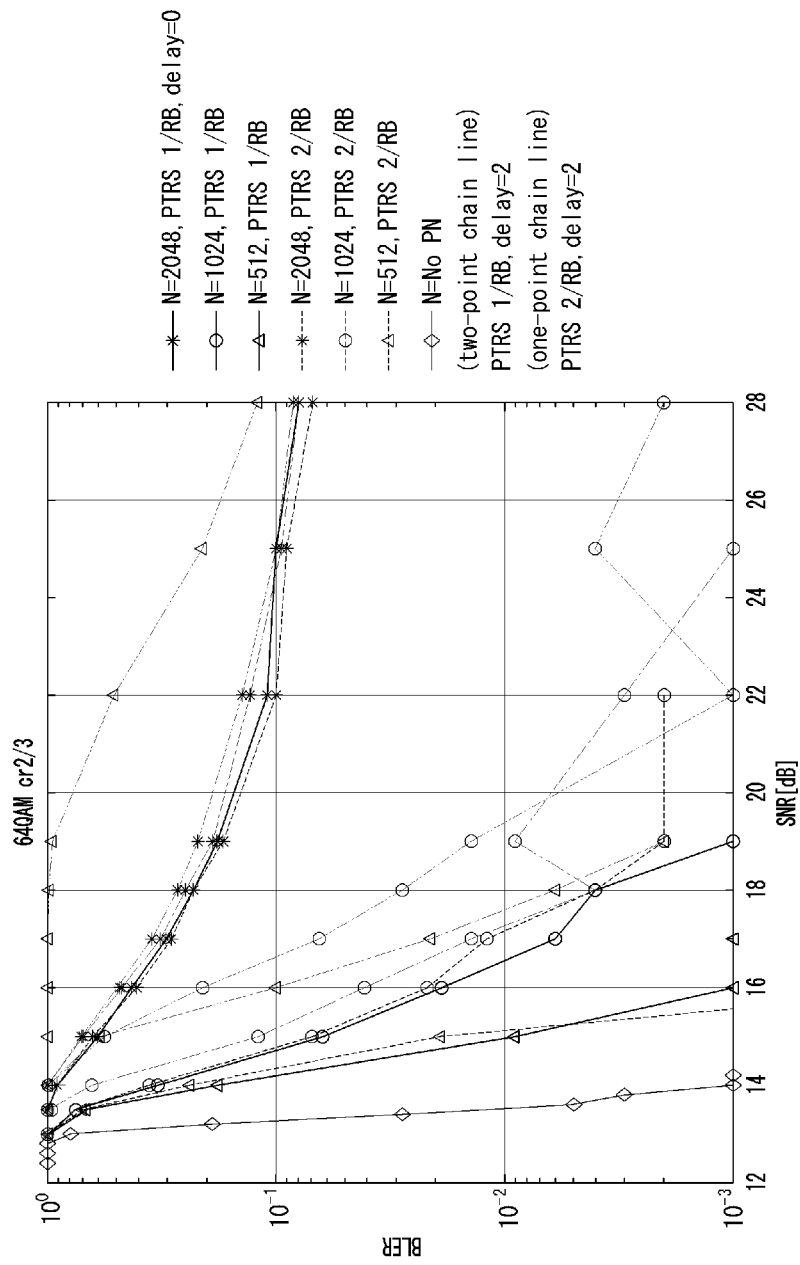
FIG. 8 is a simulation graph for comparing performances of a case where one PTRS is allocated for one RB and a case where two PTRSs are allocated for one RB based on the PTRS arrangement method according to the present disclosure.

FIG. 7 is a simulation graph for 64QAM reception performance in an AWGN channel according to $k_{ref}^{RE}$ and time-delayed samples based on the PTRS arrangement method according to the present disclosure, and FIG. 8 is a simulation graph for comparing performances of a case where one PTRS is allocated for one RB and a case where two PTRSs are allocated for one RB based on the PTRS arrangement method according to the present disclosure.

The simulation conditions of FIGS. 7 and 8 are as follows.
Carrier frequency: 30/250 [GHz]
FFT size: 2048/1024/512
Subcarrier spacing: 1500/3000/6000 [kHz]
Sampling frequency: 3.072 GHz
Turbo decoder code rate: 2/3
PTRS 1/RB ($K_{PTRS}$=2, $L_{PTRS}$=1), PTRS 2/RB ($K'_{PTRS}$=4, $L_{PTRS}$=1)

FIGS. 7 and 8 show BLER results for the 64QAM scheme in the AWGN channel environment when a carrier frequency is 250 GHz and a subcarrier spacing is 1500 KHz. Based on 15 kHz, a subcarrier spacing of the existing 3 GHz band, looking at a BLER under AWGN in a frequency band 100 times higher than the existing 3 GHz band, a BLER of $10^{-2}$ can be achieved, although performance degradation occurs due to a phase noise up to the 16QAM scheme. However, since an error floor occurs with a subcarrier spacing of 1500 kHz in the 64QAM scheme, CPE estimation performance can be improved by doubling or quadrupling the subcarrier spacing. However, as the subcarrier spacing increases, performance degradation occurs due to time sample errors of the receiving node.

FIG. 7 shows performances when the existing PTRS arrangement method and when the PTRS arrangement method proposed in the present disclosure are applied. Specifically, in FIG. 7, when one PTRS is allocated per RB, there is no difference in performance when there is no time-delayed sample according to the offset $k_{ref}^{RE}$, but when there are time-delayed samples, the performance varies according to the offset.

FIG. 8 shows performances when one PTRS is allocated per RB and when two PTRS are allocated per RB. When there is no time-delayed sample at the receiving end, there is not much difference in the PTRS estimation performances between the conventional method and the methods proposed in the present disclosure. However, it can be confirmed that performance degradation increases as the subcarrier spacing increases when there are time sample errors. It can be confirmed that the PTRS arrangement method proposed in the present disclosure is less sensitive to time sample errors.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. A method for transmitting a phase-tracking reference signal (PTRS) by a transmitting node, the method comprising:
    identifying a time density of PTRS and a frequency density of PTRS;
    identifying a first offset in frequency domain within a resource block (RB) and a second offset in frequency domain within an RB different from the first offset;
    determining a position of a subcarrier to transmit a first PTRS and a position of a subcarrier to transmit a second PTRS by alternately using the first offset and the second offset in the frequency domain;
    determining an RB to transmit each of the first PTRS and the second PTRS from resources allocated to a receiving node;
    configuring a data channel including data, demodulation reference signals (DMRSs) for demodulation of the data, the first PTRS, and the second PTRS; and
    transmitting the data channel to the receiving node,
    wherein when the second PTRS is allocated to a first RB to which the first PTRS is allocated, the second PTRS is not allocated to a second RB to which the second PTRS is allocated so that the frequency density of PTRS is maintained.

2. The method according to claim 1, wherein the first offset is determined based on an antenna port of a DMRS associated with the first PTRS among the DMRSs.

3. The method according to claim 2, wherein the second offset is determined based on an antenna port of a DMRS associated with the second PTRS among the DMRSs, and has a value different from the first offset.

4. The method according to claim 3, wherein the first PTRS and the second PTRS are preconfigured through higher layer signaling.

5. A transmitting node comprising a processor, wherein the processor causes to the transmitting node to perform:
   identifying a time density of PTRS and a frequency density of PTRS;
   identifying a first offset in frequency domain within a resource block (RB) and a second offset in frequency domain within an RB different from the first offset;
   determining a position of a subcarrier to transmit a first PTRS and a position of a subcarrier to transmit a second PTRS by alternately using the first offset and the second offset in the frequency domain;
   determining an RB to transmit each of the first PTRS and the second PTRS from resources allocated to a receiving node;
   configuring a data channel including data, demodulation reference signals (DMRSs) for demodulation of the data, the first PTRS, and the second PTRS; and
   transmitting the data channel to the receiving node,
   wherein when the second PTRS is allocated to a first RB to which the first PTRS is allocated the second PTRS is not allocated to a second RB to which the second PTRS is allocated so that the frequency density of PTRS is maintained.

6. The transmitting node according to claim 5, wherein the first offset is determined based on an antenna port of a DMRS associated with the first PTRS among the DMRSs.

7. The transmitting node according to claim 6, wherein the second offset is determined based on an antenna port of a DMRS associated with the second PTRS among the DMRSs, and has a value different from the first offset.

8. The transmitting node according to claim 7, wherein the first PTRS and the second PTRS are preconfigured through higher layer signaling.

* * * * *